United States Patent [19]
Vogl

[11] Patent Number: 5,820,465
[45] Date of Patent: Oct. 13, 1998

[54] OVERLOAD CLUTCH

[75] Inventor: Norbert Vogl, Rott, Germany

[73] Assignee: Chr. Mayr GmbH & Co. KG, Mauerstetten, Germany

[21] Appl. No.: 491,911

[22] PCT Filed: Jan. 11, 1994

[86] PCT No.: PCT/EP94/00067

§ 371 Date: Oct. 10, 1995

§ 102(e) Date: Oct. 10, 1995

[87] PCT Pub. No.: WO94/16237

PCT Pub. Date: Jul. 21, 1994

[30] Foreign Application Priority Data

Jan. 15, 1993 [DE] Germany ............ 43 00 952.2

[51] Int. Cl.⁶ .................................................. F16D 7/06
[52] U.S. Cl. ..................... 464/36; 464/23; 192/56.57
[58] Field of Search .................... 464/36, 35, 30, 464/23; 192/56.54, 56.57, 56.62, 30 W, 110 R

[56] References Cited

U.S. PATENT DOCUMENTS

| | | |
|---|---|---|
| 2,775,327 | 12/1956 | Gearhart . |
| 3,012,456 | 12/1961 | Dracka . |
| 3,429,407 | 2/1969 | Orwin et al. . |
| 3,441,115 | 4/1969 | Gunther . |
| 3,695,059 | 10/1972 | Laubauch . |
| 4,373,923 | 2/1983 | Kilwin ................. 192/56.57 X |
| 4,460,077 | 7/1984 | Geistoff ................. 192/56.57 X |
| 4,538,715 | 9/1985 | Konrad et al. ............ 192/56.57 X |
| 5,005,684 | 4/1991 | Fuji ......................... 192/56.57 |
| 5,092,441 | 3/1992 | Fuji ......................... 192/56.54 |

FOREIGN PATENT DOCUMENTS

| | | |
|---|---|---|
| 2596476 | 10/1987 | France ........................... 464/35 |
| 136638 | 3/1959 | Germany . |
| 7008345 | 3/1970 | Germany . |
| 2341781 | 8/1973 | Germany . |
| 30 48 090 A1 | 12/1982 | Germany . |
| 33 29 858 A1 | 7/1984 | Germany . |
| 40 05 986 A1 | 8/1990 | Germany . |
| 41 23 349 C1 | 3/1993 | Germany . |
| 623899 | 8/1981 | Switzerland . |
| 360486 | 1/1973 | U.S.S.R. . |
| 479904 | 12/1975 | U.S.S.R. . |

Primary Examiner—Eileen A. Dunn
Attorney, Agent, or Firm—Roth & Goldman

[57] ABSTRACT

An overload clutch has a driving and a driven coupling body (1,2), axially oriented teeth (2a) and radially oriented teeth (15a), torque-transmitting bodies (10) which mesh with the teeth (2a, 15a), a thrust collar (3) for holding the torque-transmitting bodies (10) emmeshed with the teeth (2a, 15a), a spring arrangement (11) for stressing the thrust collar (3) in the meshing direction of the torque-transmitting bodies (10), as well as an adjusting nut (5) for adjusting the spring arrangement (11). In order to avoid difficulties in handling and to increase operational safety, the adjustment path of the adjusting nut (5) is delimited towards and away from the spring arrangement (11) by stops (1b and 13) and the length of the adjusting nut (5) is adapted to the stops.

19 Claims, 2 Drawing Sheets

OVERLOAD CLUTCH

The present invention relates to an overload clutch of the type having a pair of rotatable coupling elements which are relatively axially moveable and are spring biased toward each other to engage torque transmitting elements on the coupling elements.

In the case of these overload clutches, difficulties exist in handling that lead to unsafe situations during operation. These difficulties comprise the following: the adjusting nut can be adjusted too far on the spring arrangement and this leads to blocking of the spring arrangement so that the clutch no longer responds correctly; when using a plate spring arrangement that has a characteristic curve that initially ascends as one increases the spring path that is traversed and then descends and finally, ascends again, only the descending branch may be utilized in order that the torque should immediately decrease and then increase no further during the response of the clutch; the setting up of other torques and, subsequently, the restoration of the original torque by the user during operation is possible only in an inaccurate manner so that the clutch does not respond reliably at the desired torque; the initial value of the torque that is to be set up is not defined unambiguously, e.g. because reference points on the threads on one component of the clutch and inside the adjusting nut cannot be defined accurately during manufacture and, in addition, an unambiguous assignment of the starting value to a scale on the adjusting nut is not possible, as a result of which accuracy in the adjustment of torque again suffers; with deficient attentiveness, the situation can arise that a clutch of this type is taken into operation in the disengaged state or remains in this state after disengagement; and it is not always immediately apparent why the clutch has been disengaged.

The task that therefore forms the basis of the invention is to provide a remedy for these difficulties and thus to increase operational safety.

The preferred features and advantages of the invention subsequently disclosed can be combined with one another in any desired way and then they cooperate in a supplementary manner in order to improve the accomplishment of the task without mutually hindering one another.

A torque limiting safety clutch is known from German Patent Application DE-OS 30 48 090 in which the plate springs are supported by an adjusting nut that is capable of undergoing screw tightening and, in order to adapt the safety clutch, use can be made of a larger or smaller number of plate springs. After setting up the triggering torque, the adjusting nut is capable of being fixed with a grub screw.

German Patent Application DE-OS 23 41 781 shows a clutch for transmitting a limited torque using several screw-compression springs that are arranged concentrically in pairs and are inserted in the axial holes of a lid, whereby the lid can be adjusted in an axial direction by means of a bush that has been provided with a screw thread. The bush is located adjacent to a snap ring at the rear that limits its movement toward the outside.

By making use of plate springs in accordance with the invention, the arrangement, in accordance with the invention, of a stop in the path of the adjusting nut in the direction away from the spring arrangement results in the advantage that, with certainty, only the ascending branch of the characteristic curve of the plate springs is utilized.

In accordance with U.S. Pat. No. 3,012,456, a torque wrench for tightening screws is equipped with a housing in which a number of plate springs act on the tool via a sheath. The adjustment of the plate springs is brought about via a lid that is adjusted in an axial direction on the housing by means of screw threads. Gaskets are located on the plate springs in a rear sided position at the internal front wall of the lid, whereby the adjustment of the lid relative to the plate springs is transmitted by gaskets. A mark is applied at the circumference of the lid, whereby the mark points in an axial direction and indicates the adjustment of the lid, together with a scale that has been provided on the jacket of the housing. Neither the arrangement of the gaskets nor the indicator device are suitable for an overload clutch of the special type of construction that is assumed to be known by the invention.

An example of an embodiment of the invention is illustrated and described in the in which.

Figure 1:
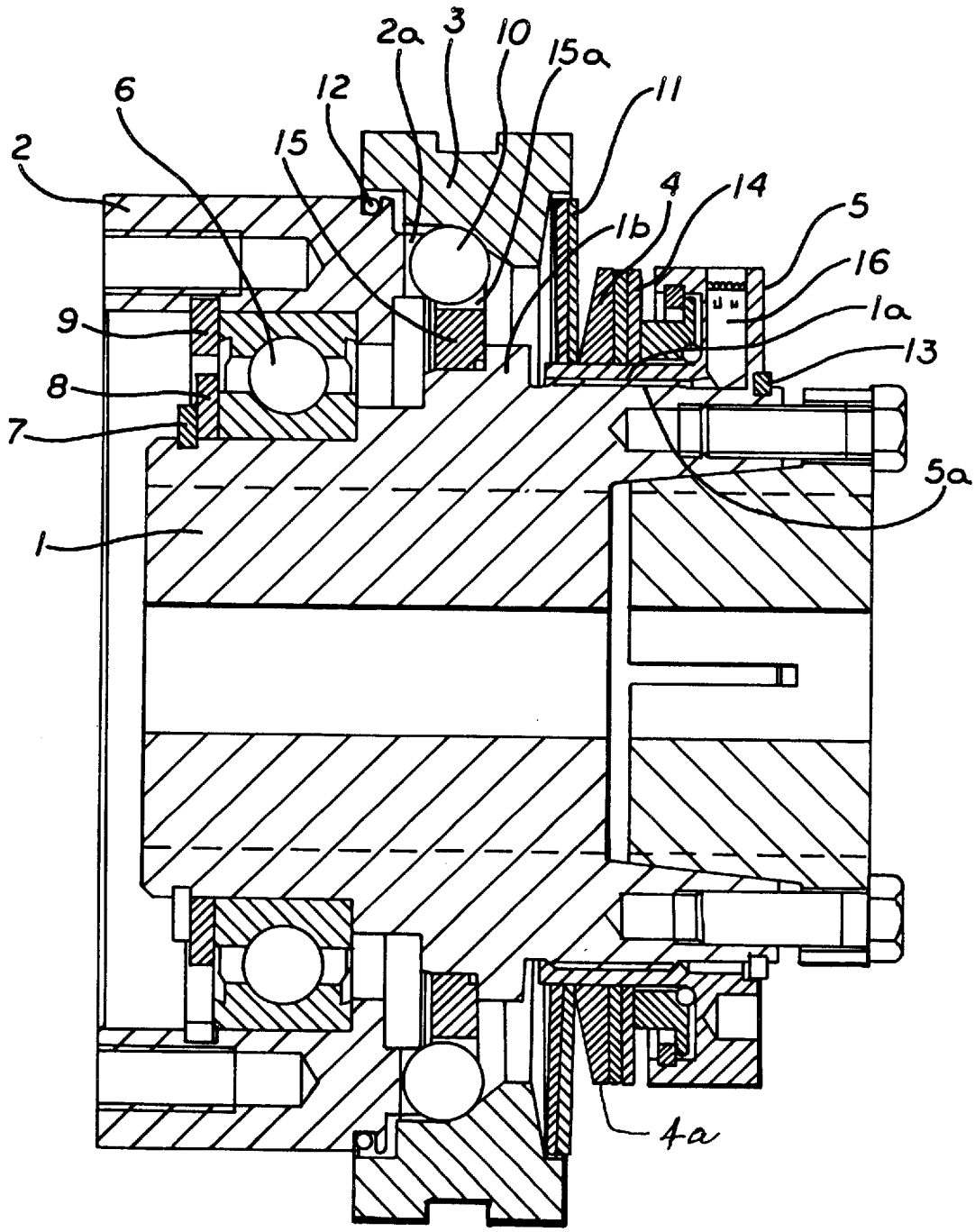
FIG. 1 shows a longitudinal section through an overload clutch in accordance with the invention.
Figure 2:
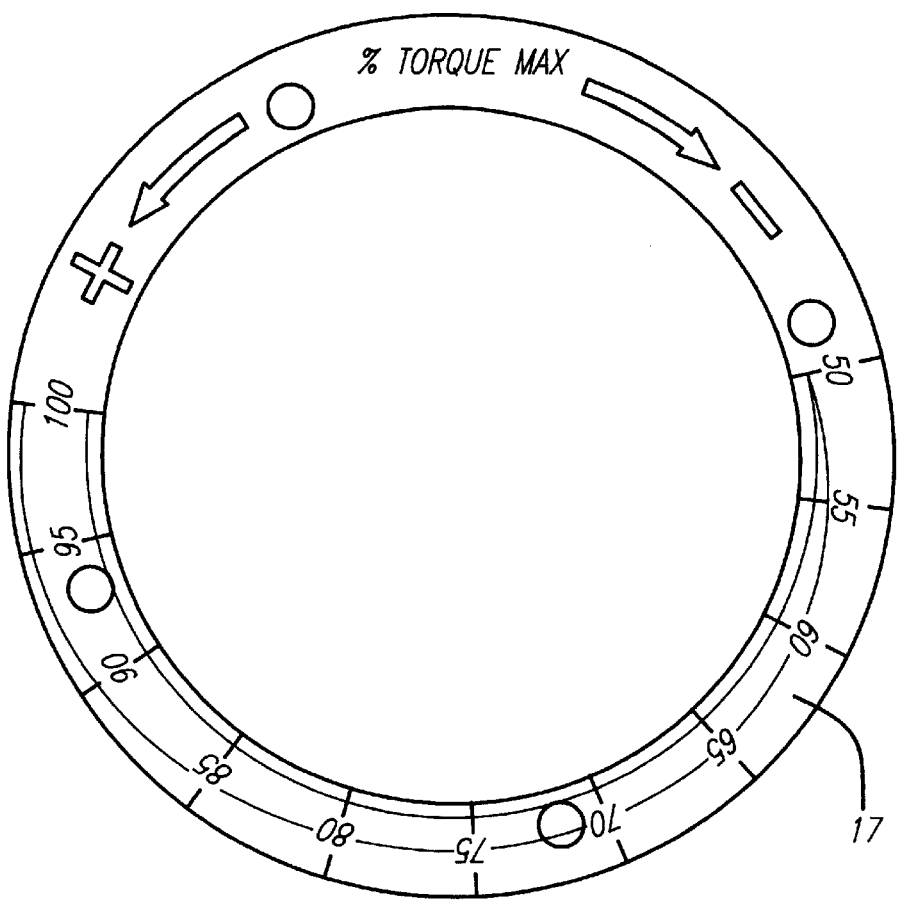
FIG. 2 shows a front view of the adjusting nut.

In these drawings, 1 designates the hub of a first coupling element with an external thread 1a and a flange 1b acting as a stop. However, this same stop can also be a snap ring that has been inserted into a circumferential groove on the hub 1 or a ring nut that has been secured against loosening and that has been screwed onto the hub 1. A second coupling element is designated by 2 and possesses an axially oriented set of teeth 2a. 3 represents a thrust collar. 4 is a conical intermediate gasket and ring assembly which carries a thrust collar 4a; 5 signifies an adjusting ring or nut that runs toward the springs in a sheathing and carries an internal thread 5a. A ball bearing is designated by 6. It is located on one side of a shoulder on the hub 1 and is fixed on the other side by a securing ring 9 and a support gasket 8 that are located adjacent to a securing ring 7. The torque transfer elements in spherical form carry the number 10. A spring arrangement 11 with plate springs is located adjacent to, and between, the intermediate gasket and ring assembly 4 and the thrust collar 3. 12 is a colored O-ring on the rear end of the coupling component 2; it is inserted in an annular groove and is visible in an overload situation. The adjusting ring or nut 5 is located on the outside of, and adjacent to, a thrust collar or snap ring 13 in a circumferential groove on the hub 1 in the form of a stop. Instead of this snap ring 13, a flange or a ring nut, that has been secured against loosening and that is screwed onto the hub 1, can also serve as a stop. 14 represents equalizing gaskets that have been inserted between the adjusting nut 5 and the intermediate gasket and ring assembly 4. 15 is the designation of a ring that is located on the hub 1 in a rotation-proof manner and carries a radially oriented set of teeth 15a. The adjusting nut 5 can be fixed by means, for example, of a screw 16. A colored mark has been applied to the coupling element 2, e.g. in the form of the colored O-ring 12 or a circumferentially colored stripe that is concealed in the engaged state of the clutch, e.g. by the thrust collar 13, and becomes visible only in the situation where the clutch is disengaged. As far as the color is concerned, use is best made of a shock-inducing color, preferably red or a fluorescent color. The scale 17 on the adjusting nut 5 is marked off in percentages of the maximum torque that is noted on a type-designation plate on the clutch that is not shown. A mark on the hub 1, or a part that is connected thereto in a rotation-proof manner, is located opposite the scale 17. However, it is also possible to apply the scale to the hub 1 or to a component that is connected to it in a rotation-proof manner and to apply the mark to the adjusting nut 5.

The clutch that is illustrated is shown in the engaged state in accordance with FIG. 1, whereby the thrust collar 3 has been pushed toward the left by the spring arrangement 11 and thus simultaneously holds the torque transfer elements 10 in engagement with the sets of teeth 2a and 15a. In this way, torque is transmitted by the spheres 10.

On reaching the response torque that has been set up, the torque transfer elements 10 and the thrust collar 3 migrate toward the right against the force of the springs 11 in FIG. 1 so that the elements 10 come out of engagement with the axially oriented set of teeth 2a as a result of which the transmission of torque is interrupted. The outward migration of the thrust collar 3 can be sensed by means of a suitable device in order, for example, to switch off the drive motor and in order to be able to eliminate the reason for exceeding the torque limit that was set up.

As a result of the stop flange 1b and the adaptation of the length of the adjusting nut 5, its path in the direction toward the spring arrangement 11 is limited in such a way that the spring arrangement cannot be subjected too strongly to pre-tensioning.

Figure 3:
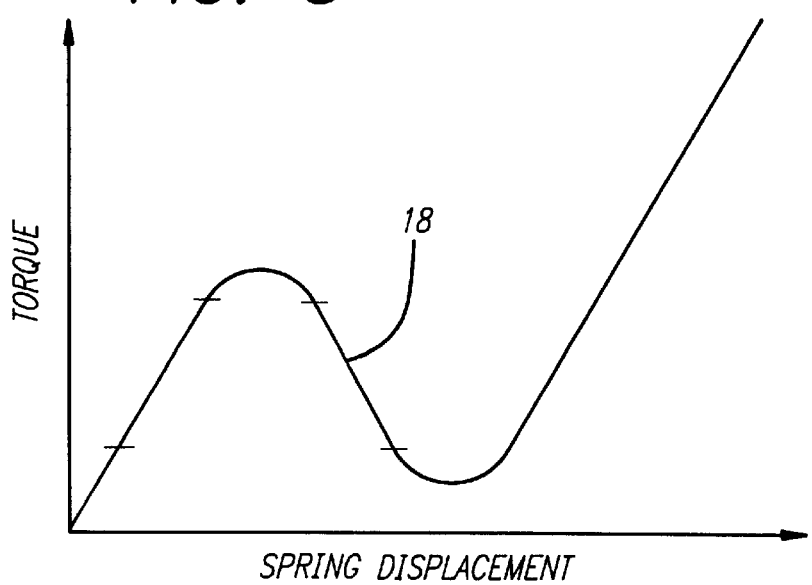
FIG. 3 shows the characteristic curve of a plate spring arrangement.

As a result of the second stop, for example the snap ring 13, the adjustment path of the adjusting nut 5 is also limited by the spring arrangement 11. As a result of this, one ensures that only the descending portion of the characteristic curve 18 of the plate spring arrangement 11 is exploited (FIG. 3).

If the maximum torque is to be changed by the operator, or even by the manufacturer, then it is sufficient to change the number of springs in the plate spring arrangement 11 and the number of equalizing gaskets 14 by way of the feature that, instead of removing a plate spring 11, an equalizing gasket 14 can be inserted and conversely. In any case, for the size of clutch that was originally established, the total thickness of all of the plate springs 11 and the equalizing gaskets 14 must remain constant to maintain the relationship to the position of the stops, e.g. the flange 1b and the snap ring 13, and to the adjustment path of the adjusting nut 5. A total of four gaskets and plate springs is shown in the illustrated embodiment.

The hub 1 or a component that is connected to it in a rotation-proof manner in the form of one of the coupling components or the adjusting nut 5 is provided with a mark in the manufacturing works during the setting up of the new clutch, whereby the mark shows the reference value or initial value for setting up the torque with the help of the adjusting nut 5. The limiting torque can then be changed by rotating the adjusting nut 5 or, if required, set back to the original value, by reading off the scale 17 that is attached to the right hand front surface of the adjusting nut 5 or, as the case may be, the hub 1 or, as the case may be, the component that is connected to this in a rotation-proof manner in FIG. 1, whereby the scale that is marked in percentages of the maximum torque is read off and whereby the maximum torque can be indicated on the type-designation plate on the clutch or noted in the form of a multiple of a basic amount multiplied by the number of plate springs 11 that are inserted.

When modifying the maximum torque with constant dimensions of the clutch by changing the number of inserted plate springs (at least one; at the most, e.g. four) only the type-designation plate therefore needs to be changed as an indication to the operator, whereby the type-designation plate indicates the maximum torque that has been set up.

If the clutch is disengaged then, for example, the colored O-ring 12 or, as the case may be, a circumferential colored stripe becomes visible and therefore indicates in a manner, that cannot be overlooked, that the disengaged state exists.

List of reference numbers
1 hub
1a external thread
1b flange
2 coupling element
2a axially oriented teeth
3 thrust collar
4 intermediate gasket and ring assembly
5 adjusting ring or nut
5a internal thread
6 ball bearing
7 securing ring
8 support gasket
9 securing ring
10 torque transfer element
11 spring arrangement
12 O-ring
13 thrust collar or snap ring
14 equalizing gaskets
15 ring
15a radially oriented teeth
16 screw
17 scale
18 characteristic curve of the spring arrangement 11

I claim:
1. An overload clutch comprising:
 a) a driving coupling element;
 b) a driven coupling element, said coupling elements being arranged for rotation about the same axis and having mutually opposed indentations;
 c) torque transfer elements disposed in said indentations between said coupling elements for coupling said coupling elements together for rotation;
 d) a plate spring arrangement for urging said coupling elements toward each other to urge said torque transfer elements into said mutually opposed indentations in the two coupling elements; and
 e) an adjusting nut for adjusting spring compression in the spring arrangement; said clutch being characterized by
 f) stops at each end of the path of axial travel of said adjusting nut for limiting the axial travel of said adjusting nut, said adjusting nut having a portion thereon which is moveable between said stops to confine operation of said spring arrangement to a descending portion of a curve plotting torque and spring displacement of the spring arrangement and at least one equalizing gaskets positioned between the adjusting nut and the plate spring arrangement.

2. The overload clutch in accordance with claim 1, characterized by the feature that one of the stops comprises a flange on one of the coupling elements.

3. The overload clutch in accordance with claim 1, characterized by the feature that one of the stops comprises a snap ring disposed in a circumferential groove on one of said coupling elements.

4. The overload clutch in accordance with claim 1, characterized by the feature that at least one of the stops is a ring nut that has been screwed onto one of the coupling elements and has been secured against turning.

5. The overload clutch of claim 1, wherein said driving coupling element and said driven coupling element are separated by a surface on one of said elements that extends axially.

6. The overload clutch in accordance with claim 1, characterized by a thrust collar between said plate spring arrangement and said equalizing gaskets.

7. The overload clutch in accordance with claim 1, characterized by the feature that the sum of the plate springs in said plate spring arrangement and the equalization gaskets is constant.

8. The overload clutch in accordance with claim 7, characterized by the feature that the sum of the plate springs and the equalization gaskets is four.

9. The overload clutch in accordance with claim 1, characterized by a position indicating mark on said coupling element that carries the adjusting nut.

10. The overload clutch in accordance with claim 9, characterized by the feature that the adjusting nut carries a scale on the side that is turned toward said mark on said coupling element.

11. The overload clutch in accordance with claim 10, characterized by a reference mark on said adjusting nut.

12. The overload clutch in accordance with claim 11, characterized by the feature that the coupling element carries a scale on the side that is turned toward the mark.

13. The overload clutch in accordance with claim 12, characterized by the feature that the scale indicates the setting as a percentage of the maximum torque.

14. The overload clutch in accordance with claim 1, characterized by a screw affixing said adjusting nut in the desired position of rotation to said coupling.

15. The overload clutch of claim 1, wherein said driving coupling element and said driven coupling element are separated by a surface on one of said elements that extends radially.

16. The overload clutch of claim 1, wherein said driving coupling element and said driven coupling element are separated by a surface on one of said elements that extends conically.

17. An overload clutch comprising:
   a) a driving coupling element;
   b) a driven coupling element, said coupling elements being arranged for rotation about the same axis and having mutually opposed indentations;
   c) torque transfer elements disposed in said indentations between said coupling elements for coupling said coupling elements together for rotation;
   d) a plate spring arrangement for urging said coupling elements toward each other to urge said torque transfer elements into said mutually opposed indentations in the two coupling elements; and
   e) an adjusting nut for adjusting spring compression in the spring arrangement; said clutch being characterized by
   f) stops at each end of the path of axial travel of said adjusting nut for limiting the axial travel of said adjusting nut, said adjusting nut having a portion thereon which is moveable between said stops to confine operation of said spring arrangement to a descending portion of a curve plotting torque and spring displacement of the spring arrangement and further characterized by a colored marking on one of said coupling elements positioned to be concealed during engagement of the clutch and to be revealed following disengagement of the clutch.

18. The overload clutch in accordance with claim 17, characterized by the feature that the colored marking comprises a ring positioned in a circumferential groove on one of the coupling elements.

19. The overload clutch in accordance with claim 18, characterized by the feature that the colored marking comprises a circumferential stripe on one of the coupling elements.

* * * * *